United States Patent
Kim

[11] Patent Number: 6,137,532
[45] Date of Patent: *Oct. 24, 2000

[54] COLOR IMAGE FILTERING APPARATUS AND METHOD FOR USE IN A DIGITAL CAMERA

[75] Inventor: Ji-Ho Kim, Seoul, Rep. of Korea

[73] Assignee: Samsung Electronics Co., Ltd., Kyungki-Do, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/841,598

[22] Filed: Apr. 30, 1997

[30] Foreign Application Priority Data

Jun. 29, 1996 [KR] Rep. of Korea .................. 96-26425

[51] Int. Cl.[7] ........................................ H04N 9/77
[52] U.S. Cl. .................... 348/222; 348/234; 348/663; 348/668; 348/577
[58] Field of Search ............................ 348/222, 234, 348/606, 624, 663, 461, 474, 475, 476, 576, 577, 668, 712, 713, 584, 587, 590, 592, 586, 598

[56] References Cited

U.S. PATENT DOCUMENTS

| | | | |
|---|---|---|---|
| 4,511,921 | 4/1985 | Harlan et al. | 348/602 |
| 4,564,856 | 1/1986 | Sanderson et al. | 358/444 |
| 4,750,050 | 6/1988 | Belmares-Sarabia et al. | 348/584 |
| 4,908,701 | 3/1990 | Udagawa | 358/520 |
| 5,461,429 | 10/1995 | Konishi et al. | 348/223 |
| 5,647,020 | 7/1997 | Mitsuhashi et al. | 382/102 |
| 5,818,522 | 10/1998 | Sato et al. | 348/222 |
| 5,838,373 | 11/1998 | Hasegawa et al. | 348/222 |

*Primary Examiner*—Wendy Garber
*Assistant Examiner*—Mitchell White
*Attorney, Agent, or Firm*—Sughrue, Mion, Zinn, Macpeak & Seas, PLLC

[57] ABSTRACT

A color filter device of a digital camera which comprises a luminance processor, a color processor, a control unit, and a color memory for storing color data. The color memory is controlled by the control unit so as to provide user-selected color data when the control unit terminates an output of the color processor to perform a color filtering, so that the user-selected color data is combined with luminance data output by the luminance processor.

7 Claims, 6 Drawing Sheets

COLOR IMAGE FILTERING APPARATUS AND METHOD FOR USE IN A DIGITAL CAMERA

BACKGROUND OF THE INVENTION

1. Field of the Invention

The present invention relates to a color filter device for a digital camera which makes it possible for a user to select a color, and method therefor. The present application is based upon Korean Application No. 26425/1996, which is incorporated herein by reference.

2. Description of the Related Art

Referring to FIG. 1, an optical signal incident upon a lens of a camera is converted to an electrical signal by a photoelectric converter 111 which may be composed of a charge-coupled device, for example. A signal detector 112 detects the size of a signal output from the photoelectric converter 111, and may be composed of a correlated double sampling, for example. A gamma corrector 113 receives a signal from the signal detector 112 and adjusts an input and an output to be proportional to each other by correcting a luminescence feature of the input signal. An analog-to-digital (A/D) converter 114 converts an output from the gamma corrector 113 into digital data. A luminance/color (Y/C) separator 115 separates the digital data of the composite video signal output from the A/D converter 114 into a luminance signal Y and color difference signals B−Y and R−Y, where Y, B−Y and R−Y are expressed as Y=0.59G+0.3R+0.11B, B−Y=−0.59G−0.3R+0.89B and R−Y=−0.59G+0.7R−0.11B, respectively.

The luminance signal Y and the color difference signals B−Y and R−Y may differ according to the treatment of the R, G, B signals and the characteristics of the photoelectric converter 111. A luminance processor 116 performs processing on the luminance signal Y from the Y/C separator 115. A color processor 117 generates a color signal C by processing the color difference signals B−Y and R−Y from the Y/C separator 115. The Y/C separator 115, the luminance processor 116 and the color processor 117 form a signal processor 100.

A digital-to-analog (D/A) converter 118 converts the luminance Y data from the luminance processor 116 to an analog signal and a D/A converter 119 converts the color C data from the color processor 117 to an analog signal. A luminance/color (Y/C) mixer 120 generates a composite video signal by mixing the luminance signal Y and the color signal C from the D/A converters 118 and 119, respectively. The composite video signal from the Y/C mixer 120 is applied to a view finder of a camera, the VCR of a camcorder, and a video signal output terminal.

Some camera systems comprise video input terminals for receiving the signal treated luminance data Y and color difference data B−Y and R−Y directly from the D/A converters. Accordingly, it is desirable for the camera system to be equipped with video output terminals for transmitting the treated Y, B−Y and R−Y signals in addition to the video output terminal transmitting the composite video signal. In the system as illustrated in FIG. 1, the video output terminals are installed to directly transfer the signals from the luminance processor 116 and the color processor 117.

The color data C composed of the B−Y and R−Y color difference signals is determined by a signal received from a lens of a camera. An optical signal received from the lens has its natural hue when a color filter is not used on the lens. When a color filter is used to change a color of a video signal in a camera, the changed color signal can not be changed a second time. So once the color of a video signal is changed using the color filter, it is impossible to change the color of the video signal during playback.

SUMMARY OF THE INVENTION

It is an object of the present invention to provide a digital color filter and method for allowing a user to change the color of a video signal by using a memory for storing color data in a digital camera.

It is an another object of the present invention to provide a digital color filter device for changing the color of a reproduced video signal.

According to the present invention, a color filter device of a digital camera comprises a luminance processor, a color processor, a control unit, and a color memory for storing color data. The color memory is controlled by the control unit so as to provide color data selected by a user when the control unit cuts off the output of the color processor to perform color filtering, so that the selected color data is combined with luminance data.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 2:
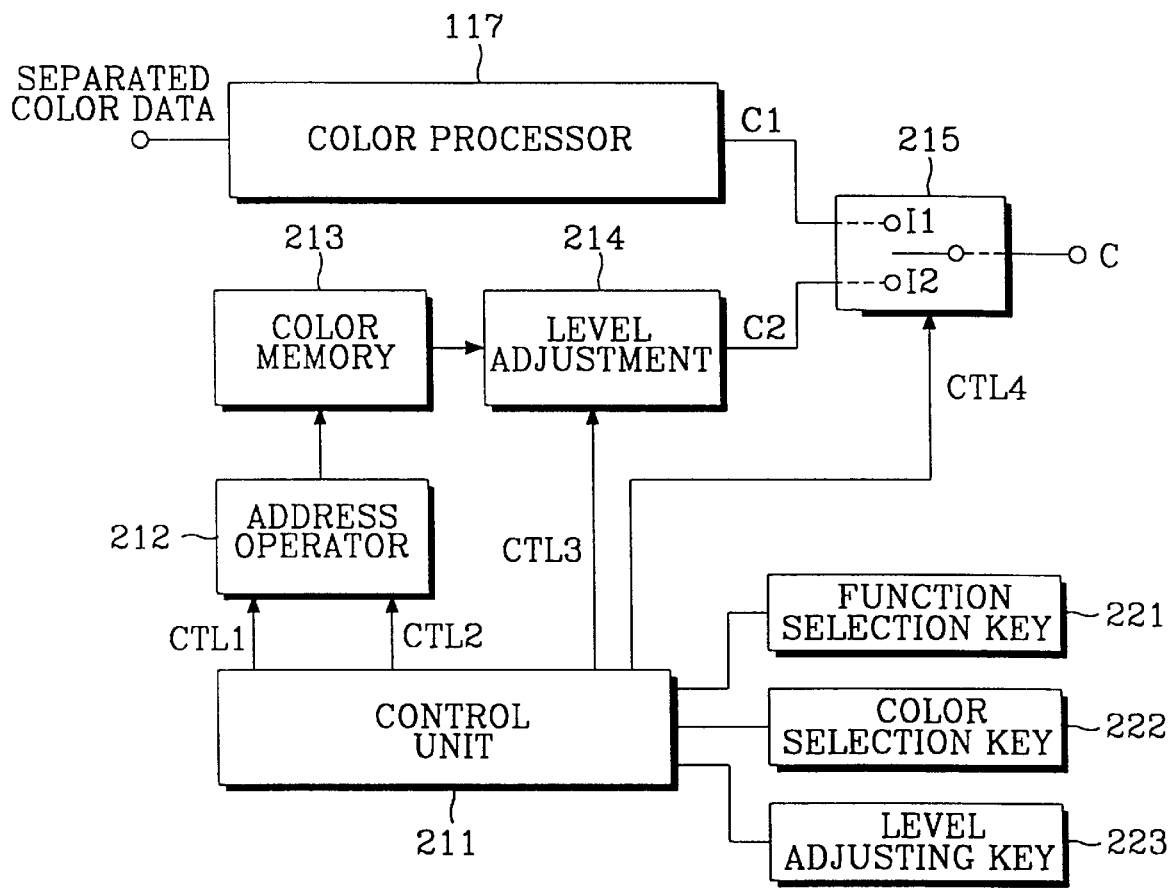
FIG. 2 is a block diagram illustrating a color filter device of a digital camera.

Referring to FIG. 2, the digital color filter device is connected in parallel with the color processor 117. The color processor 117 generates color data C1 by operating on color data transmitted from the Y/C separator 115. A function selection key 221, a color selection key 222, and a level adjusting key 223 are user-operated keys for setting a digital color filter function, selecting a desired color, and adjusting the level of a selected color, respectively. A control unit 211 controls the overall function of the digital color filter device by receiving signals from the function selection key 221, the color selection key 222, and the level adjusting key 223. The control unit 211 generates a fourth control signal CTL4 for performing a color filter function by selecting an output from the color filter device when receiving a signal from the function selection key 221. The control unit 211 generates a second control signal CTL2 which is phase-locked with a burst signal of a video signal for activating color selection and a first control signal CTL1 for selecting color data desired by a user when receiving a signal from the color selection key 222. The control unit 211 generates a third control signal CTL3 for adjusting the output level of the color data selected by the user when receiving a signal from the level adjusting key 223.

An address operator 212 is activated when the second control signal CTL2 is generated, and the first control signal CTL1 is loaded as an initial address value to which a step value is later added. The address operator 212 is not activated when the second control signal CTL2 is terminated. The address operator 212 has hardware comprising a register and a counter, and the control unit 211 generates the address using the software illustrated in the flow chart of FIG. 6.

The color memory 213 stores color data for performing the color filter function and generates the color data by accessing the color data corresponding to the address output from the address operator 212. The color memory 213 has a look-up table for generating a color sub-carrier. The look-up table is determined by the color vector scope, illustrated in FIG. 3, in which a phase difference between a burst signal and color data of a video signal represents hue.

The level adjustment 214 produces adjusted color data by adjusting the level of color data selected from the color memory 213 using the third control signal CTL3 generated by the control unit 211. The level adjustment 214 comprises a shift register. The third control signal CTL3 adjusts the level of color data by controlling the shift of color data stored in the shift register.

First terminal I1 and second terminal I2 of a selector 215 are connected to an output terminal of the color processor 117 and an output terminal of the level adjustment 214, respectively. The color data from the color processor 117 is designated as C1 and the color data from the level adjustment 214 is designated as C2. The selector 215 transmits the color data C1 received from the color processor 117 or the color data C2 selected for performing a color filter function using the fourth control signal CTL4. The selector 215 is comprised of a multiplexer.

The contour of a video signal is generally determined by the luminance Y. The same function of the color filter is performed by changing a color signal while maintaining the luminance in the video signal in its original state. The function of the color filter is embodied by mixing a user-selected color signal with a luminance signal maintained in its original state. The color filter function is performed using the color filter function key 221 and the color selection key 222 located in a key panel of a camera system. The color data is stored in the color memory 213 in the look-up table for generating a color sub-carrier. The hue of a video signal is determined based on a phase difference between a burst signal and color data.

Figure 3:
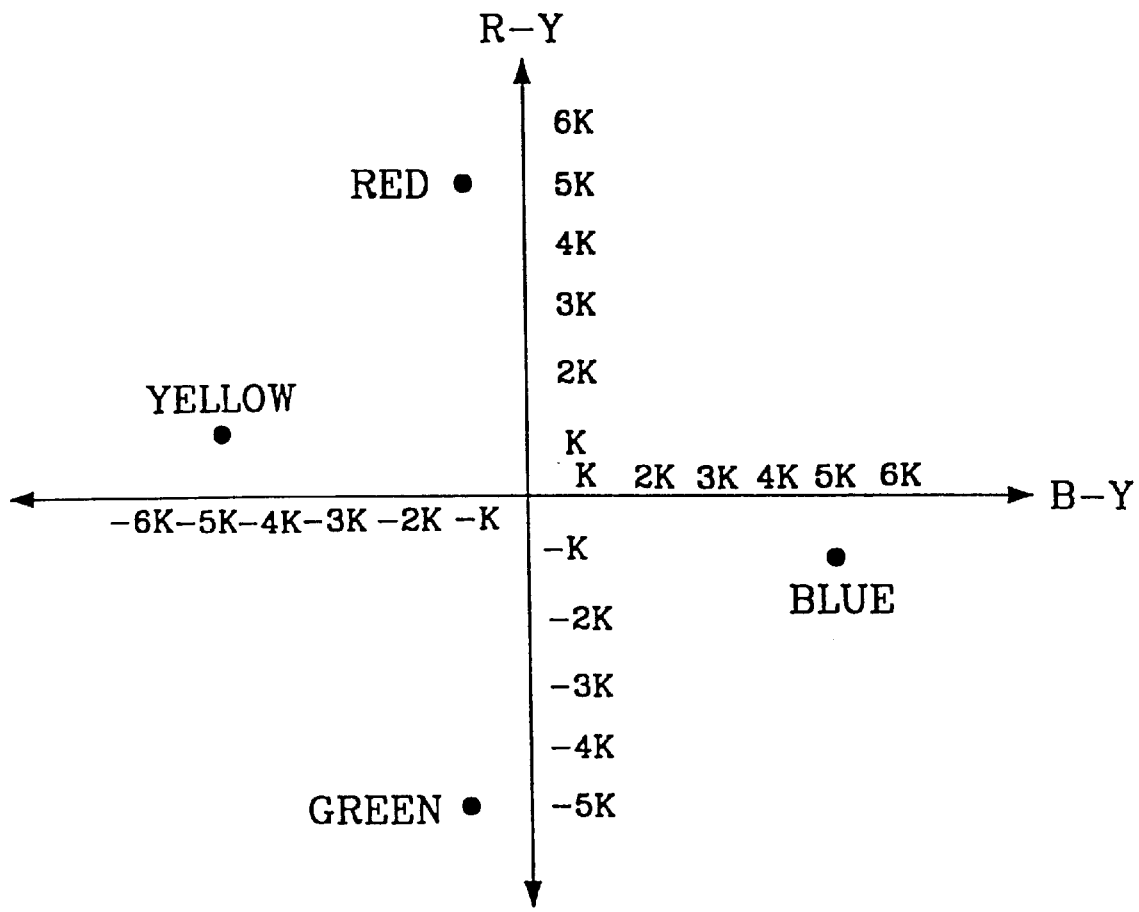
FIG. 3 is a graph illustrating a vector scope according to the phase of color difference data.
Figure 4:
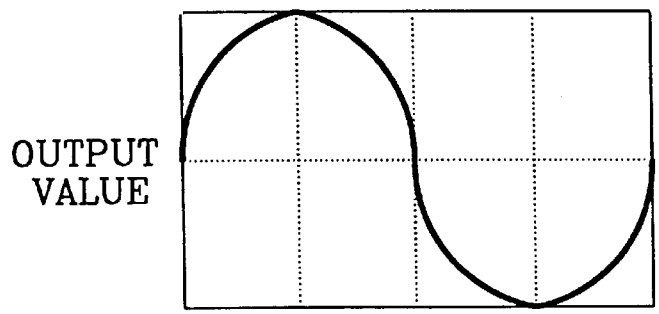
FIG. 4 is a graph illustrating a color data table stored in a color memory shown in FIG. 2.

Referring to the color vector scope of FIG. 3, yellow is expressed as the B-Y color difference signal being -5 k and the R-Y color difference signal being k, red is expressed as B-Y being -k and R-Y being 5 k, blue is expressed as B-Y being 5 k and R-Y being -k, and green is expressed as B-Y being -k and R-Y being -5 k. Color data close to yellow is generated when close to the phase of a burst signal, and color data close to blue is generated when close to a phase which is reverse to that of the burst signal.

Figure 1:
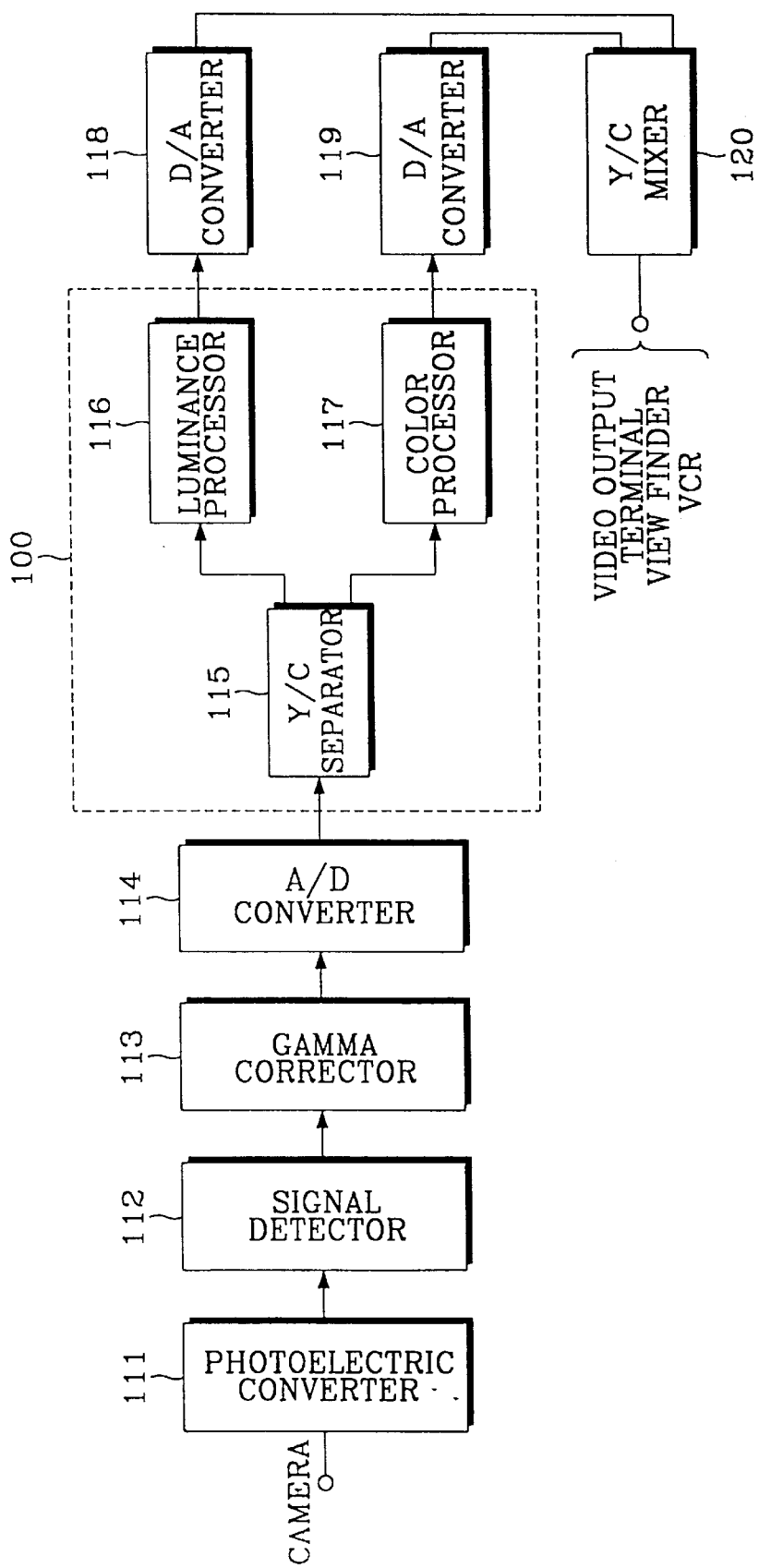
FIG. 1 is a block diagram illustrating the structure of an optical camera.
Figure 5A:
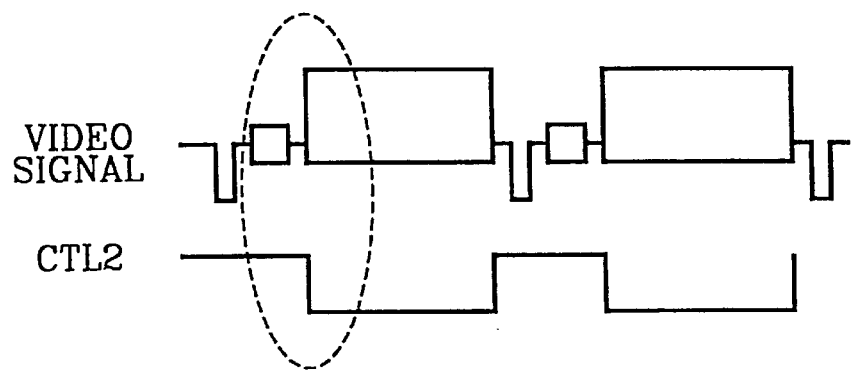
FIGS. 5(A) and 5(B) are graphs illustrating the relationship between a burst signal and second control signal in a video signal.
Figure 5B:
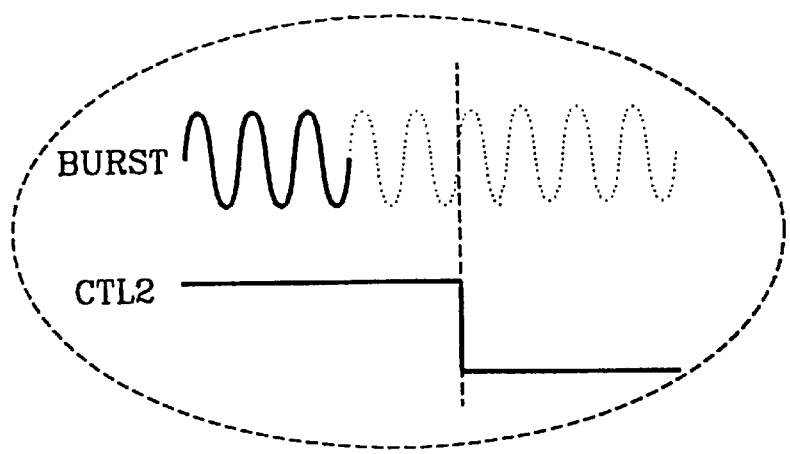

The look-up table of the color memory 213 is formed so as to generate color data corresponding to the phase of a burst signal. When the color filter function is not selected, the selector 215 transmits the color data C1 from the color processor 117 via the first input terminal I1, so the camera system illustrated in FIG. 1 thereby transmits the luminance data Y and the color data C1 corresponding to a received video signal. Alternatively, when the color filter function is selected and the control unit 211 receives a signal from the function selection key 221, the control unit 211 activates the fourth control signal CTL4 and the selector 215 transmits the color data C2 selected by the user via the second input terminal I2 by terminating the color data C1 of the received video signal. The control unit 211 generates the first control signal CTL1 and the second control signal CTL2 when receiving a signal from the color selection key 222 for selecting a desired color. The second control signal CTL2 is in phase with the burst signal and activates an addressing operation. Referring to FIGS. 5A and 5B, where FIG. 5B is an exploded view of the circled portion of FIG. 5A, the second control signal CTL2 is activated during a video signal horizontal period of low logic and is synchronized with the phase of a burst synchronizing signal. Thus, the address operator 212 is activated when a video signal interval is in phase with the burst signal.

The address operator 212 activated by the second control signal CTL2 generates an address signal of the color memory 213 and controls the address value of the color memory 213 according to the value of the first control signal CTL1 received from the control unit 211. The first control signal CTL1 is an initial address value selected by a user, and is control data for selecting color data desired by a user by having a phase difference from the burst signal. The address operator 212 generates an address of the color memory 213 by loading the first control signal CTL1 as the initial value and adding a step value to it. Assuming that the initial address value is CTL1 and the step is S, the step S is obtained by the following formula:

$$S=(N \times Fsc)/Fs,$$

where N is the data size of the look-up table representing one period of a sub-carrier, Fsc is the color sub-carrier, Fs is the sampling frequency, and S is an address step variable. When the color data is 256 gradations, in an NTSC video signal the step S is equal to 64 when N=256, Fsc=3.58 MHz, and Fs=14.318=4Fsc.

Figure 6:
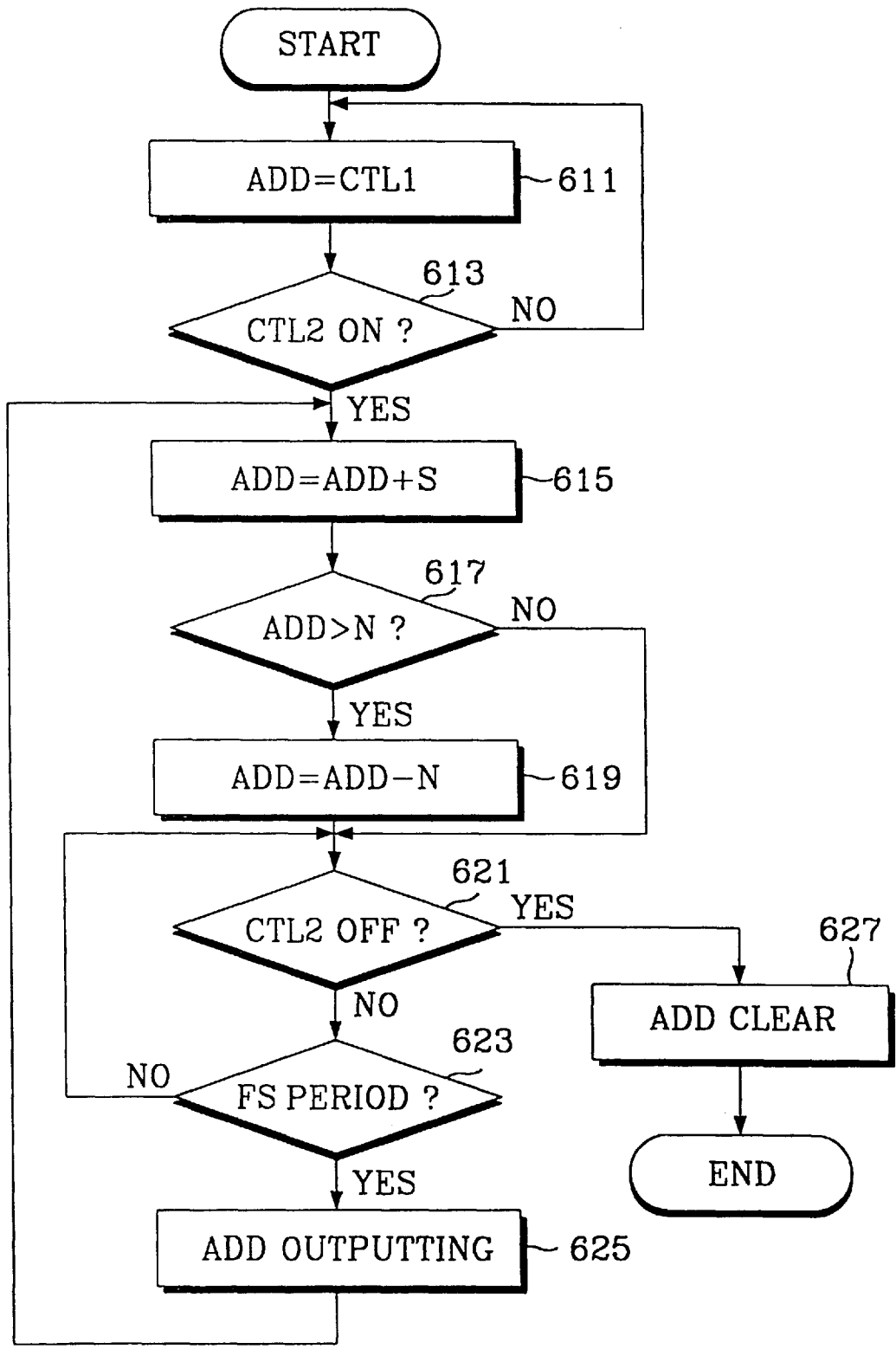
FIG. 6 is a flow chart illustrating the steps for generating an address of the color memory.

FIG. 6 illustrates the steps for determining an address of the color memory 213. The address operator 212 sets an initial address value to be the first control signal CTL1 transmitted from the control unit 211 in step 611. If it is determined that the second control signal CTL2 is activated in step 613, the address ADD is determined by accumulating the step variable S on the initial address value in step 615. If it is determined that the address ADD is larger than the data size N of the color memory 213 in step 617, the data size N is subtracted from the address ADD in step 619 so as to prevent the address value from increasing beyond the address range of the color memory 213.

The address ADD is transmitted as an address of the color memory 213 in step 625 by sensing a sampling period in step 623. Afterward, the address operator 212 repeats the steps described above after adding the step variable to the address ADD in step 615. At this time, the address ADD is obtained by adding 2S to CTL1. The address ADD is applied as an address to the color memory 213 by accumulating the step variable S according to the sampling period and the address is changed in step 617 and 619 when the address becomes greater than the data size N. The address operator 212 clears the address and returns in step 627 when the second control signal CTL2 is not activated by high logic when transmitting the address of the color memory 213.

Accordingly, the control unit 211 produces the first control signal CTL1 and activates the second control signal CTL2 synchronized with the phase of the burst signal in a video signal interval of one horizontal period when the user operates the color selection key 222. The first control signal CTL1 is a control signal for selecting color data and the second control signal CTL2 is a control signal for activating an address-producing operation. The address operator 212 supplies an address of the color memory 213 by accumulating the step variable on the initial address value after loading the first control signal CTL1 as an initial address value when the second control signal CTL2 is activated. The address operator 212 operates using software of the control unit 211, as illustrated in FIG. 6, and may also be embodied by hardware including a counter, etc.

When the level adjustment key 223 is operated during selection of a color filter function, the control unit 211 generates the third control signal CTL3 for determining the size of the color data selected by the user. The third control signal CTL3 is data for adjusting the level of selected color data. The level adjustment 214 generates the color data size by adjusting the size transmitted from the color memory 213 according to the third control signal CTL3 from the control unit 211. When the level adjustment 214 is composed of a shift register, the third control signal CTL3 is composed of control data including the direction and the number of shifts. The level adjusting modes are as follows:

¼ mode: generating color data shifted down by 2 bits;

½ mode: generating color data shifted down by 1 bit;

1 mode: generating color data without a shift;

2 mode: generating color data shifted up by 1 bit; and 4 mode: generating color data shifted up by 2 bits.

The color data size becomes smaller if the color data is shifted down, and becomes larger if shifted up. The color filter function is performed as the selector 215 transmits the color data C2 which is selected by a user and has its level adjusted.

Figure 7:
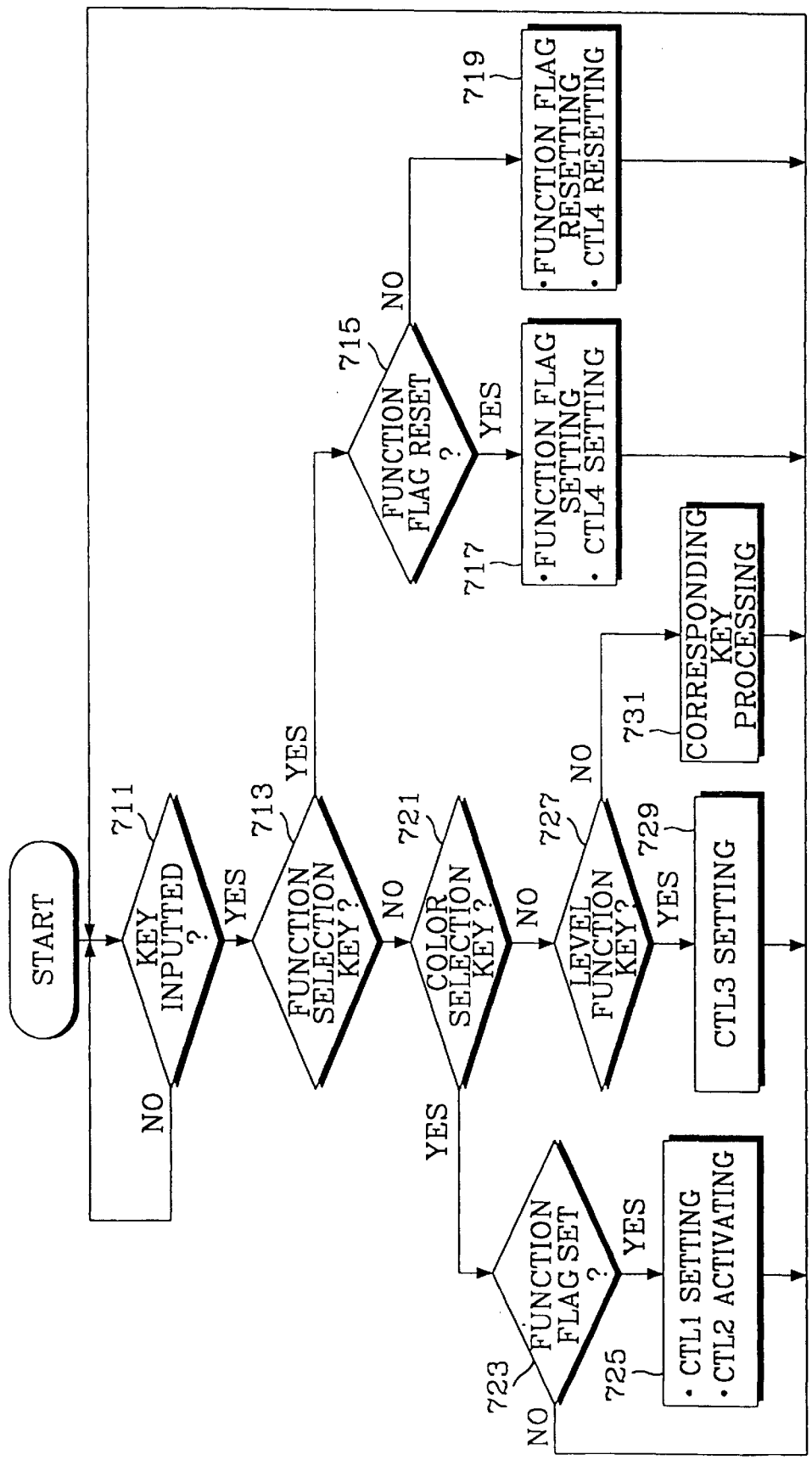
FIG. 7 is a flow chart illustrating a color filter function in a digital camera.

Referring to FIG. 7, the control unit 211 detects whether the function selection key 221 is operated in step 713 after sensing the operation of a key in step 711. The control unit 211 then detects whether a function flag is reset in step 715. The function flag is set by selecting a color filter function and reset by canceling it. In other words, the control unit sets the function flag by pushing the function selection key one time and resets it by pushing it a second time. Accordingly, the control unit 211 sets the function flag for indicating selection of a color filter function and activates the fourth control signal CTL4 in step 717 when the function flag is reset in step 715. As the fourth control signal CTL4 is activated, the selector 215 selects an output received from the level adjustment 214 through the second terminal I2.

In this state, the control unit 211 detects whether the function flag is set in step 723 after sensing that the color selection key 222 is operated by a user in step 721. When the function flag is set, the control unit 211 generates the second control signal CTL2 for activating the first control signal CTL1 and the address operator 212 for setting the color data selected by a user in step 725. At this time, the second control signal CTL2 is activated during a video interval of one horizontal period of low logic. The address operator 212 receives the first control signal CTL1 as an initial address value and generates an address of the color memory 213 by adding a step variable S to the initial address value. The output of the address operator 212 is controlled by the second control signal CTL2.

The color memory 213 stores a look-up table for generating a color sub-carrier and the color data is accessed by the first control signal CTL1 as the initial address value. The color memory 213 accesses color data close to yellow when the address from the address operator 212 is in phase with the burst signal when the first control signal CTL1 is near 0, and accesses color data close to blue when the address from the address operator 212 is in a phase reverse to that of the burst signal when the first control signal CTL1 is near N/2, where N is the data size of the look-up table representing one period of a sub-carrier. The color memory 213 selects relevant color data from the look-up table by generating a sub-carrier according to an address value from the address operator 212.

By operating the level adjusting key 223, the control unit 211 generates the third control signal CTL3 having direction and size (shift direction and number in the shift register) by analyzing the received level adjusting value in step 727. The level adjustment 214 adjusts the level of color data selected by the color memory 213 according to the third control signal CTL3 in step 729. The selector 215 selects the color data processed as described above and transmits it. The luminance processor 116 transmits the luminance data Y of the received video signal in its original state, and the color data selected by a user is transmitted instead of the output of the color processor 117. Accordingly, the original video signal mixed with the color signal selected by a user results in the performance of the color filter function. The control unit 211 senses the operation of the function key 221 for performing the color filter function in step 713 and detects the state of a function flag in step 715. When the color filter function is selected, the control unit 211 resets the function flag and does not activate the fourth control signal CTL4 in step 719. The selector 215 selects the color data C1 received from the color processor 117 through the first terminal I1. Then, the luminance processor 116 transfers the luminance data Y of the video signal in its original state, and the selector 215 transfers the color data C1 received from the color processor 117. As a result, the color filter function is not performed, and the video signal is transferred in its original state.

Thus, the digital color filter function is easily performed by reconstructing a video signal by mixing an original video signal with a color selected by a user in a digital camera. The expression of color is diversified by using the look-up table for generating a color sub-carrier, and the adjustment of color density is possible by adjusting the level of the color data. Accordingly, a user can freely mix a color signal with a luminance signal of a received video signal. In this case, the video signal can be reconstructed using a selected color without a color filter in the camera system (e.g., a camcorder).

While the present invention has been described and illustrated herein with reference to the preferred embodiments thereof, it will be understood by those skilled in the art that various changes in form and details may be made therein without departing from the spirit and scope of the invention.

What is claimed is:

1. A color filter device of a digital camera, comprising:
    a luminance processor for providing luminance data;
    a color processor connected in parallel with said luminance processor for processing, in conjunction with said luminance processor, a video signal and outputting a color signal;
    a control unit connected in parallel with said color processor;
    a color memory, connected to an output terminal of said control unit, for storing color data and for outputting the stored color data in response to a signal output by said control unit in accordance with first user input, wherein the stored color data output from said color memory is independent of the video signal;

a selector for selecting, in response to second user input, either the color signal output by said color processor or the stored color data output by said color memory and outputting a selected color signal; and a mixer for combining the selected color signal and the luminance data provided by said luminance processor.

2. A color filter device of a digital camera as defined in claim 1, wherein said color memory stores a look-up table for generating a color sub-carrier, and said control unit controls an addressing operation of said color memory so as to select said user-selected color data.

3. A color filter device of a digital camera as defined in claim 2, further comprising a level adjustment, connected to an output terminal of said color memory, for adjusting a level of said user-selected color data.

4. A color filter device of a digital camera comprising:

a luminance processor:

a color processor for processing a video signal in conjunction with said luminance processor;

a key input including a filter function selection key and a color selection key;

a control unit for generating a first control signal to select color data, a second control signal to activate an addressing operation in phase with a burst signal upon operation of said color selection key, and a third control signal upon operation of said function selection key;

an address operator activated by said second control signal for loading said first control signal as an initial value of an address and subsequently adding a step variable to said address;

a color memory for storing a look-up table for generating a color sub-carrier to provide color data corresponding to said address generated by said address operator, said color data being independent of the video signal;

a selector for selecting and outputting either one of an output of said color processor or the color data provided by said color memory in response to said third control signal; and a mixer for combining a luminance signal output by the luminance processor and the output of said selector.

5. A color filter device of a digital camera comprising:

a luminance processor;

a color processor for processing a video signal in conjunction with said luminance processor;

a key input including a filter function selection key, a color selection key and a level adjustment key;

a control unit for generating a first control signal to select color data, a second control signal to activate an addressing operation in phase with a burst signal upon operation of said color selection key, a third control signal to adjust a level of said color data upon operation of said level adjustment key, and a fourth control signal upon operation of said function selection key;

an address operator activated by said second control signal for loading said first control signal as an initial value of an address and subsequently adding a step variable to said address;

a color memory for storing a look-up table for generating a color-sub-carrier to provide a color data corresponding to said address generated by said address operator, said color data being independent of the video signal;

a level adjustment connected to an output terminal of said color memory for adjusting the level of said color data using said third control signal and outputting level adjusted color data;

a selector for selecting and outputting either one of an output of said color processor or the level adjusted color data output by said level adjustment in response to said fourth control signal; and a mixer for combining a luminance signal output by the luminance processor and the output of said selector.

6. A method for performing a color filtering in a digital camera having a luminance processor to generate a processed luminance signal based on a luminance signal in a received video signal, a color memory for storing a look-up table to generate a color sub-carrier, a level adjustment to adjust a level of chosen color data, thereby to produce level-adjusted color data, and a selector to select one of color data of the received video signal and said level adjusted color data, comprising the steps of:

accessing said chosen color data by controlling said color memory upon color selection, said chosen color data being independent of the received video signal;

adjusting the level of said chosen color data to generate said level-adjusted color data, upon level adjustment;

selecting either said adjusted color data when color filtering is desired or selecting said color data of the received video signal; and combining the color data selected in the selecting step with the processed luminance signal.

7. A method for performing a color filtering in a digital camera having a luminance processor to generate a processed luminance signal based on a luminance signal in a received video signal, a color memory for storing a look-up table to generate a color sub-carrier, a level adjustment to adjust a level of a chosen color data, thereby to produce level-adjusted color data, and a selector to select one of color data of the received video signal and said level adjusted color data, comprising the steps of:

accessing said chosen color data from said color memory, said chosen color data being independent of the received video signal;

adjusting the level of said chosen color data to generate said level-adjusted color data;

selecting either one of said level-adjusted color data or said color data of the received video signal, using said selector; and combining the color data selected in the selecting step with the processed luminance signal.

* * * * *